United States Patent [19]

Lazear et al.

[11] 4,185,050

[45] Jan. 22, 1980

[54] PRESSURE SENSITIVE ADHESIVE COMPOSITIONS COMPRISING A MIXTURE OF TERPOLYMERS

[75] Inventors: Nelson R. Lazear, Chatham; Robert W. Stackman, Morris Township, Morris County, both of N.J.

[73] Assignee: Celanese Corporation, New York, N.Y.

[21] Appl. No.: 972,852

[22] Filed: Dec. 26, 1978

[51] Int. Cl.$^2$ .................. C08L 33/02; C08L 33/08
[52] U.S. Cl. .................. 525/221; 204/159.14; 428/442; 428/443; 428/463; 428/514; 428/520; 526/317
[58] Field of Search .................. 260/901; 526/317

[56] References Cited

U.S. PATENT DOCUMENTS

| | | | |
|---|---|---|---|
| 3,753,958 | 8/1973 | Wingler et al. | 260/78.5 R |
| 3,943,103 | 3/1976 | Borden et al. | 260/47 UA |
| 3,971,766 | 7/1976 | Ono et al. | 526/317 |

*Primary Examiner*—Carman J. Seccuro

[57] ABSTRACT

There is disclosed a pressure sensitive adhesive composition having improved adhesive strength and tack. This adhesive composition comprises three terpolymers, each terpolymer comprising an alkyl acrylate wherein the alkyl group contains four to fourteen carbon atoms, a vinyl ester of a saturated carboxylic acid having from one to six carbon atoms, and an ethylenically unsaturated carboxylic acid having three to five carbon atoms. The composition of terpolymers comprises a mixture of three of the terpolymers described above wherein each individual terpolymer has a different number average molecular weight. The final terpolymer composition has a specifically defined number average molecular weight, and a specifically defined molecular weight distribution.

11 Claims, No Drawings

PRESSURE SENSITIVE ADHESIVE COMPOSITIONS COMPRISING A MIXTURE OF TERPOLYMERS

BACKGROUND OF THE INVENTION

1. Field of the Invention

This invention relates to compositions which are useful as pressure sensitive adhesives. More specifically, this invention relates to pressure sensitive adhesive compositions comprising alkyl acrylates such as butyl acrylate, vinyl esters such as vinyl acetate, and ethylenically unsaturated carboxylic acids such as acrylic acid.

2. Summary of the Prior Art

Normally tacky adhesives which are adherent upon application of light finger pressure and which can be removed from the surfaces to which they are applied are known as pressure sensitive adhesives.

It is known in the art to use copolymers of vinyl acetate, butyl acrylate, and acrylic acid as coatings and adhesives generally. See U.S. Pat. Nos. 3,365,410; 3,615,557; 3,753,958; and 3,943,103. Such copolymers may also be used as pressure sensitive adhesives. See U.S. Pat. Nos. 3,654,213, and 3,971,766.

The search has continued for improved pressure sensitive adhesives having greater adhesive strength and tack. This invention was made as a result of that search.

OBJECTS AND SUMMARY OF THE INVENTION

Accordingly, a general object of the present invention is to avoid or substantially alleviate the above problems of the prior art.

A more specific object of the present invention is to provide a pressure sensitive adhesive composition having improved adhesive strength and tack.

Other objects and advantages of the invention will become apparent from the following summary and description of the preferred embodiments of the present invention.

The present invention provides a pressure sensitive adhesive composition having improved adhesive strength and tack. This composition comprises at least three terpolymers which each have the composition of (a) from about 50 to about 92% by weight alkyl acrylate wherein the alkyl group contains 4 to 14 carbon atoms, (b) from about 2 to about 50% by weight vinyl ester of a saturated carboxylic acid having from 1 to 6 carbon atoms, and (c) from about 0 to about 6% by weight ethylenically unsaturated carboxylic acid having 3 to 5 carbon atoms. The composition of terpolymers comprises (1) from about 12 to about 52% by weight of a terpolymer having a number average molecular weight of from about 20,000 to about 60,000, (2) from about 20 to about 70% by weight of a terpolymer having a number average molecular weight of from about 60,000 to about 150,000, and (3) from about 10 to about 50% by weight of a terpolymer having a number average molecular weight of from about 50,000 to about 250,000. The composition of the three terpolymers has a number average molecular weight of from about 20,000 to about 100,000, a weight average molecular weight of from about 100,000 to about 600,000 and a molecular weight distribution of from about 1.0 to about 7.0.

The essence of the present invention is the discovery that when a particular composition is prepared by intermixing the terpolymers described above using the particular number average molecular weights described above, there is prepared a pressure sensitive adhesive composition having improved adhesive strength and tack over prior art adhesives.

DESCRIPTION OF THE PREFERRED EMBODIMENTS

The following terms are used at different places in the instant specification and are all defined herein below for ease of reference.

By "quick-stick" is meant the ability of tape to adhere to a surface instantly using no pressure other than the weight of the tape itself. It is measured as the force-resisting peeling of a tape at 90° from a standard surface upon which it has been applied under no other pressure than the weight of the tape itself.

Cohesive strength or cohesion is the ability of the adhesive to resist splitting. Good cohesion is needed for clean removal.

Adhesive strength or adhesion is the bond produced by contact between a pressure sensitive adhesive and a surface.

Peel strength or peel adhesion is the force required to pull a strip of tape from a surface at a specified angle and speed. It is measured after application under specified standard conditions and is usually expressed in ounces per inch width.

Shear strength or shear adhesion is the force required to pull the pressure-sensitive tape from a standard flat surface in a direction parallel to the surface to which it has been affixed with a definite pressure.

The various tests of peel strength, shear strength, quick stick, etc. as used in the instant application are those of the Pressure Sensitive Tape Council (hereinafter "PSTC"), except as where indicated that modifications have been made.

The pressure sensitive adhesive compositions of the present invention comprise at least three terpolymers.

Each terpolymer comprises generally from about 50 to about 92, typically from about 61 to about 88, and preferably from about 73 to about 83% by weight alkyl acrylate, generally from about 2 to about 50, typically from about 11 to about 34, and preferably from about 15 to about 24% by weight vinyl ester, and generally from about 0 to about 6, typically from about 1 to about 5, and preferably from about 2 to about 3% by weight ethylenically unsaturated carboxylic acid. When more than about 92% by weight alkyl acrylate is employed, then adhesive properties such as quick stick and adhesive and cohesive strength are diminished. When less than about 50% by weight alkyl acrylate is employed, then quick stick and adhesive strength are diminished. When more than about 50% by weight vinyl ester is employed, then quick stick and adhesive properties are diminished. When less than about 2% vinyl ester is employed, then quick stick, adhesive and cohesive strength are diminished. When more than about 6% by weight ethylenically unsaturated carboxylic acid is employed, then there is no further improvement in adhesive strength. When the amount of ethylenically unsaturated carboxylic acid is decreased, then the adhesive strength of the composition is diminished.

The alkyl acrylate component of the terpolymer is composed of one or more acrylates having from 4 to 14 carbon atoms in the alkyl group, i.e., acrylic acid esters formed from alcohols having from 4 to 14 carbon atoms. Examples of such alkyl acrylates include butyl acrylate, amyl acrylate, 2-ethylhexyl acrylate, decyl acrylate, octyl acrylate, lauryl acrylate, tridecyl acrylate, and the like. Butyl acrylate is a particularly preferred alkyl acrylate.

The vinyl ester component of the terpolymers is composed of one or more vinyl esters of a saturated carboxylic acid wherein the acid may contain from 1 to 6 carbon atoms. Such esters include, for example, vinyl acetate, vinyl propionate, vinyl butyrate and vinyl valerate. Vinyl acetate is a particularly preferred vinyl ester.

The ethylenically unsaturated carboxylic acid component of the terpolymer may contain from 3 to 5 carbon atoms and includes one or more of acrylic acid, methacrylic acid, as well as itaconic, maleic, and fumaric acids. Acrylic acid and methacrylic acid are preferred. Acrylic acid is particularly preferred.

A first terpolymer (hereinafter the "first terpolymer") composed of the above-identified three comonomers is prepared according to methods known to those skilled in this art. This terpolymer has a number average molecular weight of generally from about 20,000 to about 60,000, typically from about 25,000 to about 50,000 and preferably from about 30,000 to about 40,000, a weight average molecular weight of generally from about 50,000 to about 200,000, typically from about 60,000 to about 150,000, and preferably from about 75,000 to about 85,000, and a molecular weight distribution of generally less than about 7, typically from about 1 to about 5, and preferably from about 1 to about 3.

The second terpolymer (hereinafter the "second terpolymer") composed of the above-identified comonomers is prepared according to methods known to those skilled in this art. This terpolymer has a number average molecular weight of generally from about 60,000 to about 150,000, typically from about 70,000 to about 100,000, and preferably from about 85,000 to about 95,000, a weight average molecular weight of generally from about 100,000 to about 420,000 typically from about 150,000 to about 300,000, and preferably from about 200,000 to about 250,000, and a molecular weight distribution of generally less than about 7, typically from 1 to about 5, and preferably from about 1 to about 3.

A third terpolymer (hereinafter the "third terpolymer") composed of the above-identified three comonomers is prepared according to methods known to those skilled in this art. This third terpolymer has a number average molecular weight of generally from about 50,000 to about 250,000, typically from about 100,000 to about 200,000, and preferably from about 110,000 to about 140,000, a weight average molecular weight of generally from about 450,000 to about 750,000, typically from about 500,000 to about 700,000, and preferably from about 550,000 to about 650,000, and a molecular weight distribution of generally from about 1 to about 7, typically from about 2 to about 6, and preferably from about 3 to about 5.

More than three terpolymers may be employed as desired depending upon the particular requirements of the pressure sensitive adhesive as regards adhesive strength and tack.

The final pressure sensitive adhesive is prepared by blending the three terpolymers described above to form a composition comprising the three terpolymers. This composition comprises generally from about 12 to about 52, typically from about 17 to about 47, and preferably from about 22 to about 42% by weight of the first terpolymer, generally from about 20 to about 70, typically from about 25 to about 65, and preferably from about 30 to about 60% by weight of the second terpolymer, and generally from about 10 to about 50, typically from about 12 to about 45, and preferably from about 15 to about 40% by weight of the third terpolymer.

The composition of these three terpolymers has a number average molecular weight of generally from about 20,000 to about 100,000, typically from about 30,000 to about 80,000, and preferably from about 40,000 to about 65,000, a weight average molecular weight of generally from about 100,000 to about 600,000, typically from about 125,000 to about 400,000, and preferably from about 150,000 to about 350,000, and a molecular weight distribution of generally from about 1 to about 7, typically from about 2 to about 7, and preferably from about 3.5 to about 6.

The number and weight average molecular weights of these terpolymers and terpolymer compositions are determined on a 0.2 to 0.3% by weight solution in tetrahydrofuran at 20° C. using gel permeation chromatography on Styragel columns at a flow rate of one milliliter per minute. The weights are polystyrene equivalent molecular weights.

The individual terpolymers are prepared by means known to those skilled in this art. For example, the terpolymers may be prepared by placing a solvent for the monomers, such as benzene, toluene, ethyl acetate, acetone, a mixture of hexane and methyl ethyl ketone or water with an emulsifier into a reaction vessel, adding the monomers and then adding generally from about 30 to about $10^{-4}$, typically from about 20 to about $10^{-3}$, and preferably from about 10 to about $10^{-2}$% by weight of a catalyst such as $\alpha,\alpha'$-azodiisobutyronitrile (hereinafter "AIBN"), dibenzoyl peroxide, t-butyl hydroperoxide, and ammonium persulfate to the reaction vessel and then heating the contents of the reaction vessel to the reaction temperature.

The polymerization reaction may be carried out at atmospheric, subatmospheric, or superatmospheric pressures although substantially atmospheric pressures are preferred. At atmospheric pressures, the reaction temperature is generally from about $-10$ to about 120, typically from about 20 to about 100, and preferably from about 50 to about 80° C.

The time required for the polymerization reaction depends, of course, on the concentration of monomer in the solvent. However, the polymerization reaction takes generally from about 1 to about 24, typically from about 2 to about 18, and preferably from about 3 to about 10 hours.

The terpolymers may be prepared on a batch, continuous, or semi-continuous basis, as desired.

The composition of the three terpolymers may be prepared by means known to those skilled in this art. For example, the three terpolymers may be blended together in a diluent. Such diluents include a mixture of the monomer components of the polymer with a multifunctional acrylate such as hexane diol diacrylate, trimethylolpropane triacrylate, or pentaerthritol triacrylate.

A particularly preferred diluent is a mixture of the monomer components of the polymer with a multifunctional acrylate such as hexane diol diacrylate. When this particular multi-functional acrylate is employed, the amount of multi-functional acrylate is generally from about 0.001 to about 16, typically from about 0.01 to about 8, and preferably from about 0.1 to about 4% by weight based upon the weight of the entire composition.

The amount of diluent is generally from about 5 to about 95, typically from about 40 to about 80, and preferably from about 50 to about 75% by weight of the entire composition. The amount of diluent determines the viscosity of the adhesive as applied. To decrease the viscosity, more monomer or diluent materials should be added. Preferably, the adhesive compositions of the present invention should have application viscosities of from about 200 to about 20,000 cps.

The pressure sensitive adhesive compositions of the present invention may contain from about 0.5 to about 20, preferably from about 1 to about 10%, by weight of the composition of benzoin $C_1$ to $C_{12}$ hydrocarbon alkyl ethers. Examples of such ethers include the ethyl, propyl, butyl, isopropyl, isobutyl, 2-ethylhexyl, amyl, and isoamyl ethers of benzoin.

The compositions of the present invention may also contain about 0.001 to about 1.0 percent, by weight of the composition of a triplet state sensitizer or energizer, having a triplet state energy of from about 40 to about 60 kcal/mol. Examples of these materials include eosin-Y which has the formula:

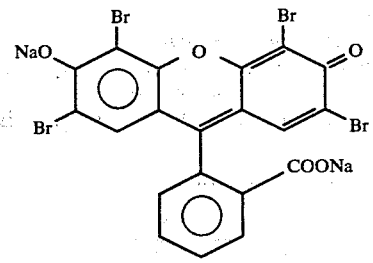

pyrene, fluorescein, stilbene, and the like.

The compositions of the present invention may be prepared at any pressure, subatmospheric, superatmospheric, or atmospheric pressures. Substantially atmospheric pressures are preferred. When substantially atmospheric pressures are employed, the preparation of these compositions may be carried out at a temperature of generally from about −30 to about 150, typically from about 0 to about 100, and preferably from about 20 to about 60° C.

The preparation of the compositions of the present invention may be on a continuous, semi-continuous, or batch basis, as desired.

The compositions of the present invention are useful as pressure sensitive adhesives. In order to be useful as such, these compositions in the form of reactive syrups, solutions, or emulsions, may be dried or cured using ultraviolet light or electron curtain cure. When electron curtain cure is employed, the initiators and sensitizers described hereinabove need not be added to the pressure sensitive adhesive compositions. For example, the compositions may be applied to a backing, then cured or dried, and a release paper placed over the composition. For a discussion of the forms of various pressure sensitive adhesives, see "Pressure-Sensitive Fastening Systems" in Adhesives Age (July 1975) at pages 31ff.

There also may be included in the composition of the present invention additive materials which do not affect the basic properties of the adhesive. Fillers, tackifiers, antioxidants, stabilizers and the like are thus sometimes added to the formulated adhesive.

The adhesives herein are applicable to various substrates and backing members. They may be used as free films or they may be employed to make a pressure-sensitive adhesive sheet or tape. They may be easily stored or transported while in solution, without precipitation of the adhesive, and applied and dried to form the desired adhesive.

The pressure-sensitive adhesives of the instant invention adhere to a wide variety of surfaces, such as, glass, metal, various plastics, wood, paper, fiber and the like. These adhesives have excellent holding power at elevated temperatures and are resistant to water, salt water, petroleum products and oil.

The pressure sensitive adhesive compositions of the present invention may be applied to flexible supports. Flexible supports that may be used include paper, fabric of all kinds, fiber fleece, plastic sheeting, modified natural substances, metal foil, metalized plastic sheeting, asbestos fiber fabric, glass fiber fabric and the like. The pressure-sensitive adhesive tapes thus obtained may be used for a variety of purposes, including tacking purposes, as films for documents, self-adhesive films suitable for writing, decorative sheeting, labels, or for the production of plaster for dressings. In addition, these tapes have excellent electrical insulation properties.

The adhesive compositions of the present invention may be applied to the chosen flexible support to film thicknesses of from about 0.1 to about 5 mils. Any number of methods of application may be employed, including spraying, roll coating, and the like. In addition, in some instances, it may be desirable to partially heat-cure the binder in the adhesive layer by exposing the applied coating to a heat treatment during or subsequent to application and prior to the ultraviolet curing step.

The term "ultraviolet", as used herein, contemplates electromagnetic radiation having wave lengths of above about 2000 Angstroms, preferably about 2000 to about 5000 Angstroms. In addition, electronic beam curing is also contemplated herein. Where ultraviolet light sources are employed, exposure times can range from about 0.1 seconds up to about 1 minute per linear foot, and generally the light radiation will have a power of about 1 to 600 watts per linear inch coming from low, medium, or high pressure ultraviolet lamps.

The present invention is further illustrated by the following examples. All parts and percentages in the examples as well as in the specification and claims are by weight unless otherwise specified.

EXAMPLE I

This example illustrates the preparation of three different terpolymers of butyl acrylate, vinyl acetate, and acrylic acid which are then combined in a diluent to produce a pressure sensitive adhesive.

Preparation of Polymer I

One hundred fifty-nine and eight one-hundredths grams of butyl acrylate, 34.92 grams of vinyl acetate, 6.00 grams of acrylic acid, 0.3 grams of AIBN, and 0.25 grams of lauryl mercaptan (a chain regulator) are added to 500 milliliters of toluene (a chain regulator) in a 5 liter reaction vessel at 60° C. under nitrogen gas in 20 minutes. The temperature rises to 80° C. The composition is heated for 10 hours at 60° C. while polymerization takes place. The final terpolymer has an intrinsic viscosity determined as 0.5% by weight polymer in $CHCl_3$ of 0.38, a number average molecular weight of 35,200, a weight average molecular weight of 82,400, and a molecular weight distribution of 2.3. The number and weight average molecular weights are determined on 0.202% by weight solutions in tetrahydrofuran by gel permeation chromatography.

Preparation of Polymer II

The same amounts of butyl acrylate, vinyl acetate, acrylic acid, AIBN, and toluene are employed as in the preparation of Polymer I but the monomers and AIBN are added to the toluene at 60° C. under nitrogen. The temperature is maintained at 60° C. for 10 hours. The final polymer has an intrinsic viscosity of 0.75, a number average molecular weight of 90,900, a weight average molecular weight of 208,000, and a molecular weight distribution of 2.3.

Preparation of Polymer III

Seven hundred ninety-five and four tenths grams of butyl acrylate, 174.6 grams of vinyl acetate, 30 grams of acrylic acid, and 1.5 grams of AIBN are added to 2500 milliliters of benzene in a 5 liter reaction vessel at 55° C. over a 2 hour period under nitrogen. The temperature rises to 81° C. The reaction is run for 10 hours keeping the temperature at about 60° C. The final polymer has an intrinsic viscosity of 1.63, a number average molecular weight of 128,000 a weight average molecular weight of 576,000, and a molecular weight distribution of 4.5.

These three terpolymers and combinations of these three polymers are then tested for their peel and shear strengths as summarized in Table I as follows.

TABLE I

| Run | Terpolymer I % | Terpolymer II % | Terpolymer III % | Peel Strength[1] | Shear Strength[2] | Intrinsic Viscosity[3] | $M_n$[4] | $M_2$[4] | $M_{wd}$ |
|---|---|---|---|---|---|---|---|---|---|
| 1 | 0 | 100 | 0 | 1.90 | 92 | 0.3 | 35200 | 82400 | 2.3 |
| 2 | 100 | 0 | 0 | 0.55 | 45 | 0.7 | 90900 | 208000 | 2.3 |
| 3 | 0 | 0 | 100 | 0.90 | 1440 | 1.6 | 128000 | 576000 | 4. |
| 4 | 50 | 0 | 50 | 1.00 | 52 | — | 47600 | 143000 | 3.0 |
| 5 | 0 | 50 | 50 | 0.55 | 102 | — | 51500 | 333000 | 6.7 |
| 6 | 50 | 50 | 0 | 1.60 | 0.7 | — | 91600 | 521000 | 5.7 |
| 7 | 33.3 | 33.3 | 33.3 | 3.00 | 3.0 | — | 63800 | 334000 | 5.2 |

[1]180° Peel in pounds per inch width, PSTC-1
[2]0° in minutes, PSTC-7, modified by using a ½" × ½" sample under a 500 gram load
[3]Determined at 0.5% in CHCl₃ at 22° C.
[4]Determined on 0.202% by weight solutions in tetrahydrofuran by gel permeation chromatography As may be seen from Table I, run 7, which is within the scope of the present invention, represents a composition of the three terpolymers which possesses a peel strength and a shear strength which is far superior to the combined properties of the other terpolymer compositions.

EXAMPLE II

The terpolymers prepared in Example I are combined in the following proportions:

Thirty two percent terpolymer I, 51% terpolymer II, and 17% terpolymer III. This composition has a number average molecular weight of 57,100, a weight average molecular weight of 205,000, and a molecular weight distribution of 3.6. A reactive syrup containing this composition is cured by ultraviolet radiation and the peel strength, shear strength, and quick stick of the compositions determined and summarized in Table II.

The data in this Table illustrate the effect of radiation dose and multifunctional acrylate (hexane diol diacrylate) concentration in the diluent on adhesive properties.

TABLE II

| Run | %HDODA[5] | Cure[6] | Peel Strength[7] | Shear Strength[8] | Quick Stick[9] |
|---|---|---|---|---|---|
| 8 | 2 | 2 at 40 | 2.50 | 1.3 | 1.2 |
| 9 | 2 | 3 at 40 | 3.50 | 2.8 | 1.2 |
| 10 | 2 | 4 at 40 | 3.50 | 8.0 | 1.2 |
| 11 | 2 | 5 at 40 | 2.00 | 81.0 | N/D |
| 12 | 2 | 6 at 40 | 1.50 | 28 | N/D |
| 13 | 16 | 1 at 40 | Less than 0.1 | 16 | N/D |
| 14 | 16 | 2 at 40 | Less than 0.1 | N/D | N/D |
| 15 | 16 | 2 at 100 | 0.6 | N/D | N/D |
| 16 | 16 | 3 at 100 | 1.0 | N/D | N/D |

N/D = Not determined
[5]Hexane diol diacrylate.
[6]Ultraviolet cure, number of passes at particular number of feet per minute.
[7]180° peel in pounds per inch width PSTC-1.
[8]0° shear in minutes PSTC-7 (modified as indicated in Table I).
[9]90° quick stick in pounds per inch width PSTC-5.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

We claim:

1. A pressure sensitive adhesive composition comprising a mixture of at least three terpolymers, each terpolymer having the composition of
   (a) from about 50 to about 92% by weight alkyl acrylate wherein the alkyl group contains 4 to 14 carbon atoms,
   (b) from about 2 to about 50% by weight vinyl ester of a saturated carboxylic acid having from 1 to 6 carbon atoms, and
   (c) up to about 6% by weight ethylenically unsaturated carboxylic acid having 3 to 5 carbon atoms, said composition of terpolymers comprising
      (1) from about 12 to about 52% by weight of said terpolymer having a number average molecular weight of from about 20,000 to about 60,000,
      (2) from about 20 to about 70% by weight of said terpolymer having a number average molecular weight of from about 60,000 to about 150,000, and
      (3) from about 10 to about 50% by weight of said terpolymer having a number average molecular weight of from about 50,000 to about 250,000, each of said terpolymers in said composition having a different number average molecule weight,
   said composition of terpolymers having a number average molecular weight of from about 20,000 to about 100,000, a weight average molecular weight of from about 100,000 to about 600,000, and a molecular weight distribution of from about 1 to about 7.

2. The composition of claim 1 wherein said alkyl acrylate is butyl acrylate, said vinyl ester is vinyl acetate and said ethylenically unsaturated carboxylic acid is acrylic acid.

3. The composition of claim 1 wherein each terpolymer comprises from about 61 to about 88% by weight alkyl acrylate, from about 11 to about 34% by weight vinyl ester, and from about 1 to about 5% by weight ethylenically unsaturated carboxylic acid.

4. The composition of claim 1 wherein said composition has an application viscosity of from about 200 to about 20,000 cps.

5. A pressure sensitive adhesive composition comprising a mixture of at least three terpolymers, each terpolymer having the composition of
   (a) from about 61 to about 88% by weight alkyl acrylate wherein the alkyl group contains 4 to 14 carbon atoms,
   (b) from about 11 to about 34% by weight vinyl ester of a saturated carboxylic acid having from 1 to 6 carbon atoms, and
   (c) from about 1 to about 5% by weight ethylenically unsaturated carboxylic acid having 3 to 5 carbon atoms, said composition of terpolymers comprising
   (1) from about 17 to about 47% by weight of said terpolymer having a number average molecular weight of from about 25,000 to about 50,000,
   (2) from about 25 to about 65% by weight of said terpolymer having a number average molecular weight of from about 70,000 to about 100,000, and
   (3) from about 12 to about 45% by weight of said terpolymer having a number average molecular weight of from about 100,000 to about 200,000, each of said terpolymers in said composition having a different number average molecule weight,
said composition of terpolymers having a number average molecular weight of from about 30,000 to about 80,000, a weight average molecular weight of from about 125,000 to about 400,000, and a molecular weight distribution of from about 2 to about 7.

6. The composition of claim 5 wherein each terpolymer comprises from about 73 to about 83% by weight alkyl acrylate, from about 15 to about 24% by weight vinyl ester, and from about 2 to about 3% by weight ethylenically unsaturated carboxylic acid.

7. The composition of claim 6 wherein said alkyl acrylate is butyl acrylate, said vinyl ester is vinyl acetate and said ethylenically unsaturated carboxylic acid is acrylic acid.

8. The composition of claim 5 wherein said composition has an application viscosity of from about 200 to about 20,000 cps.

9. A pressure sensitive adhesive composition comprising at least three terpolymers, each terpolymer having the composition of
   (a) from about 73 to about 83% by weight alkyl acrylate wherein the alkyl group contains 4 to 14 carbon atoms,
   (b) from about 15 to about 24% by weight vinyl ester of a saturated carboxylic acid having from 1 to 6 carbon atoms, and
   (c) from about 2 to about 3% by weight ethylenically unsaturated carboxylic acid having 3 to 5 carbon atoms, said composition of terpolymers comprising
   (1) from about 22 to about 42% by weight of said terpolymer having a number average molecular weight of from about 30,000 to about 40,000,
   (2) from about 30 to about 60% by weight of said terpolymer having a number average molecular weight of from about 85,000 to about 95,000, and
   (3) from about 15 to about 40% by weight of said terpolymer having a number average molecular weight of from about 110,000 to about 140,000,
said composition of terpolymers having a number average molecular weight of from about 40,000 to about 65,000, a weight average molecular weight of from about 150,000 to about 350,000 and a molecular weight distribution of from about 3.5 to about 6.

10. The composition of claim 9 wherein said alkyl acrylate is butyl acrylate, said vinyl ester is vinyl acetate and said ethylenically unsaturated carboxylic acid is acrylic acid.

11. The composition of claim 9 wherein said composition has an application viscosity of from about 200 to about 20,000 cps.

* * * * *